United States Patent [19]

Tamminen

[11] Patent Number: 4,684,585
[45] Date of Patent: Aug. 4, 1987

[54] ELECTROCHEMICAL GENERATION APPARATUS AND METHOD

[75] Inventor: Pentti J. Tamminen, Espoo, Finland

[73] Assignee: LTH Associates (c/o Blaxley-Maddox), Boston, Mass.

[21] Appl. No.: 862,490

[22] Filed: May 12, 1986

[30] Foreign Application Priority Data

Oct. 11, 1985 [FI] Finland .................................. 853968

[51] Int. Cl.$^4$ ............................................ H01M 2/38
[52] U.S. Cl. ...................................... 429/69; 429/70; 429/72
[58] Field of Search ....................... 429/69, 68, 67, 70, 429/71, 51, 210, 72

[56] References Cited

U.S. PATENT DOCUMENTS

| | | | |
|---|---|---|---|
| 3,663,298 | 5/1972 | McCoy et al. | 429/69 X |
| 3,730,776 | 5/1973 | Geisler, Jr. | 429/69 X |
| 3,767,466 | 10/1973 | McCoy et al. | 136/131 |
| 3,822,149 | 7/1974 | Hale | 429/69 X |
| 3,907,603 | 9/1975 | Kocherginsky et al. | 429/68 X |
| 3,923,550 | 12/1975 | Krusenstierna | 429/68 |
| 4,025,698 | 5/1977 | von Krusenstierna | 429/4 |
| 4,329,406 | 5/1982 | Dahl et al. | 429/92 |
| 4,399,018 | 8/1983 | Birkle et al. | 204/199 |
| 4,491,624 | 1/1985 | Sarbacher et al. | 429/69 X |
| 4,500,613 | 2/1985 | Galbraith | 429/69 |
| 4,521,497 | 6/1985 | Tamminen | 429/27 |

OTHER PUBLICATIONS

Hartman et al., "Electric Vehicles Challenge Battery Technology," 5th Energy Technology Conference, Washington, D.C., Feb. 27, 1978.
Brown, "The Nickel-Zinc Battery a Strong Candidate for Becoming a Practical Power Source for Electric Vehicles," *Batteries Today*, Feb.-Mar. 1980, p. 85.
Electrodics: More Fundamentals, pp. 1050-1061.

*Primary Examiner*—Anthony Skapars
*Attorney, Agent, or Firm*—Wolf, Greenfield & Sacks

[57] ABSTRACT

A rechargeable, electrochemical generation apparatus and method has bipolar nickel-zinc electrode cells in a stacked, serially connected configuration for providing improved reliability and charge-discharge cycling capability. The apparatus employs a rotatable container having mounted therein a plurality of the electrode cell assemblies. An electrolyte solution is circulated, preferably according to a pulsed circulation, through the electrolyte cells. The electrode cells have an anode and a cathode electrode element, and each element has a substantially planar surface in contact with the electrolyte solution. The cells are mounted so that the planar surfaces of the electrodes align with the radial direction of the centrifugal force created by rotation of the container. The container, and hence the cells, are rotated to create centrifugal forces on the order of one hundred times the pull of gravity at the outer rims of the cells.

16 Claims, 4 Drawing Figures

ELECTROCHEMICAL GENERATION APPARATUS AND METHOD

BACKGROUND OF THE INVENTION

The present invention relates to an electrochemical generator apparatus and method, and in particular to electrochemical cells, such as primary cells, secondary batteries, and fuel cells, which use an appreciably strong acceleration force, generated by a centrifugal rotor, for improving efficiency of the apparatus and for controlling the electrochemical reactions within the apparatus.

The nickel-zinc (Ni-Zn) secondary battery, invented during the last century, has been the subject of continual development efforts because it offers more than double the energy density of the more often used lead-acid battery and because its materials are less toxic, reasonably inexpensive, and abundantly available. The major disadvantage of the Ni-Zn battery, compared to the leadacid battery, has been its short life, that is, the low number of effective charge-discharge cycles when compared to the lead-acid battery. Thus while the nickel electrode can be repeatedly charged and discharged thousands of times, the zinc electrode life, in spite of all prior efforts for improvement, has limited the operating life of this type of battery to about 200 chargedischarge cycles. This short life is totally inadequate, for instance, as an energy source for an electric car.

The short life is due to the high solubility of zinc in the electrolyte (an aqueous potassium hydroxide (KOH) solution) which, on the charge portion of the cycle, leads to uneven deposition and the growth of needle-like dendritic crystals which grow toward the nickel electrode and ultimately will cause an internal short circuit in the cell. One, and perhaps the only, prior Ni-Zn battery construction which has been operated for over 1000 charge-discharge cycles is the "Vibrocell" battery, described in U.S. Pat. No. 3,923,550. This battery employs a sparse plastic web as the separator. All zinc electrodes are driven in a fast reciprocating vertical movement by mechanical means. This construction achieves a turbulent electrolyte flow in the vicinity of the zinc surface, and the zinc electrode is charged by the formation of a compact zinc layer.

The drawbacks of the embodiment described above are created (a) by the structures in each separate cell which require considerable mechanical strength, (b) by the extra weight and energy loss caused by the shaker machinery, (c) by the heavy current collecting bolts needed for each cell, with which the cells are connected in series by moving interconnect cables, and (d) by the need for separate electrolyte quantity control for each cell. This cell structure further has a high self-discharge rate that quickly leads to the complete discharge of a fully charged battery.

Thus far, therefore, Ni-Zn batteries of bipolar construction have not been successfully devised.

Objects of the present invention are to remove the disadvantages noted above and to realize a new electrochemical generator and method which is reliable, efficient, and has a large number of charge-discharge cycles in a Ni-Zn battery structure.

SUMMARY OF THE INVENTION

The generator has a tightly packed cell stack, consisting of thin, bipolar, flat annular electrodes which are provided with insulating seal rings at their inner and outer rims. The cell stack can be rotated around a center hollow shaft at high speed. The electrolyte is fed into each cell formed by the electrodes and bound by the seal rings, through holes in the inner isolation ring of each cell. The electrolyte can be removed through holes in the outer isolation ring of each cell. The electrolyte is preferably supplied according to a cyclic pulsed mode of operation. In the charge mode, the flow of drained electrolyte can be routed alternatively through overflow and gas vent tubes on the inner rims of each cell to a tubular space surrounding the rotating shaft. The strong centrifugal force, aligned along the planes of the electrodes, creates a forced mass transfer within the electrolyte on the electrode surfaces during the electrochemical reaction, and brings a sufficient quantity of zinc ions into contact with the electrode during the charge period to achieve a homogeneous, compact zinc deposition. The centrifugal forces, during discharge, remove the reaction products so effectively as to avoid passivation even at the highest current densities. The bus bars required for battery charge and discharge are routed from the end plates of the cell stack, which consist of the bipolar electrodes, through the hollow rotating shaft to insulated slip rings mounted on the shaft, and thereafter, to the terminals of the battery.

More specifically, the electrochemical generator, in accordance with the illustrated embodiment of the invention, features a rotatable container, elements for mounting in the container, a plurality of electrode cell assemblies, elements for circulating an electrolyte solution through the cell assemblies, and rotation elements for rotating the container, including the electrode cell assemblies, for subjecting the assemblies and the electrolyte solution therein to a substantial centrifugal force. The electrode cells have an anode and a cathode electrode element, and each electrode element has a substantially planar surface in contact with the electrolyte solution. The electrode cells are mounted so that these planar surfaces are at least partially, and in the illustrated embodiment completely, aligned with the radial direction of the centrifugal force. The centrifugal force to which the cells are subjected, at the outer rim thereof, can be, for example, one hundred times the force of gravity (100 g's). The generator, in accordance with the invention, facilitates the use of anode materials, such as zinc, which are easily dissolved in the electrolyte, in other, different, battery systems.

Most importantly, the generator in accordance with the invention attains significant improvements when compared with prior Ni-Zn batteries. The significant savings in weight and volume derive from a novel construction which requires no series connecting parts between the cells. Also, separators between the cells are eliminated, leaving only plastic support structures positioned to keep the electrodes uniformly spaced. The electrolyte quantity, concentration, temperature, and other parameters are automatically equalized among all cells by the novel cell structure. The structures are not superimposed with heavy loads; and therefore, a large number of parts of plastic construction can be employed. The self-discharge rate can, according to the invention, be limited to very low levels and most importantly, the zinc electrode is no longer the limiting factor for the number of charge-discharge cycles because its life span is now equal to that of the nickel electrode.

In another aspect of the invention, a rechargeable, electrochemical generation method features the steps of mounting, in a rotatable container, a plurality of rotatable electrode cell assemblies. The method further features circulating an electrolyte solution through the cell assemblies and rotating the container for subjecting the electrolyte solution, the container, and the cell assemblies therein, to a substantial centrifugal force. The invention further features providing each electrode cell with an anode and a cathode electrode element, each electrode element having a substantially planar surface in contact with the electrolyte solution, and the planar surfaces being at least partially, and preferably completely, aligned with the radial direction of the generated centrifugal forces on the electrolyte.

The method further features driving the electrolyte from a fluid supply, through the cells, and back to the supply, in a pulsed mode of operation, and filtering the flow to remove, for example, sediment particles from the circulated electrolyte.

BRIEF DESCRIPTION OF THE DRAWINGS

The aforementioned features, objects, and advantages of the invention be apparent from the following description of a preferred embodiment of the invention together with the following drawings in which.

DESCRIPTION OF A PREFERRED EMBODIMENT

Figure 1:
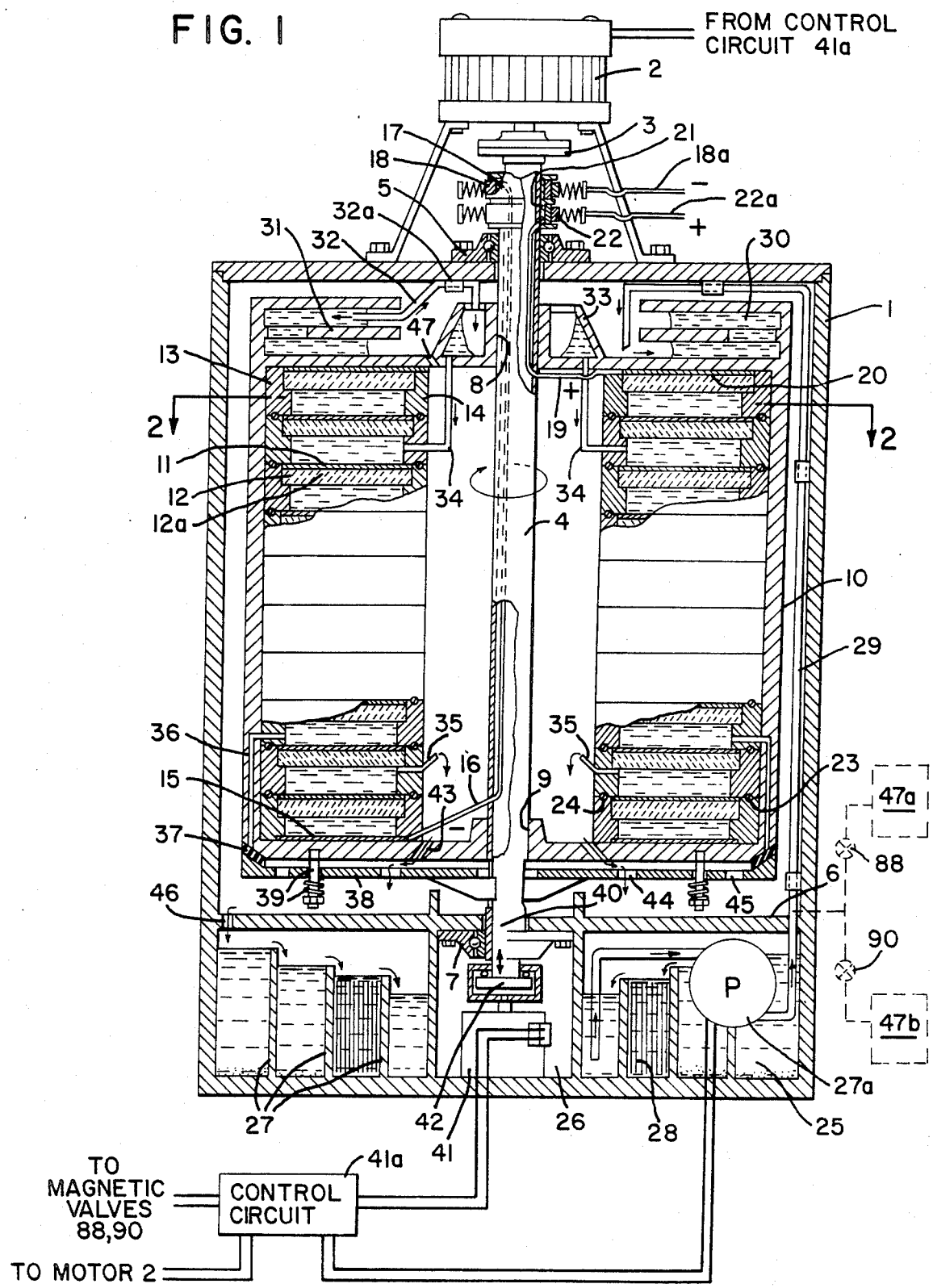
FIG. 1 is in a schematic, partially cut away, vertical cross-sectional view of a preferred embodiment of a Ni-Zn battery in accordance with the invention.

Referring to FIG. 1, an electrochemical generator, that is a battery in accordance with the illustrated embodiment of the invention, has a cylindrical plastic outer container 1, with a motor 2 mounted on the top of the container. The motor 2 rotates, through a joint connector 3, a hollow tubular shaft 4. Shaft 4 mounts at the top of the container 1 with a bearing 5 and at the bottom of container 1, on a separation floor 6 with a bearing 7.

A plastic cylinder 10, which contains the battery cells and operates as a centrifugal rotor, is mounted at locations 8 and 9 on the shaft 4. The cylinder 10 is filled with bipolar electrodes 11, 12, having a planar annular shape. In the illustrated embodiment, the negative electrode 11 is a nickel coated steel having a thickness of about 0.2 mm and the positive electrode 12 is a sintered or felt type electrode plate (Ni+Ni(OH)$_2$) having a thickness of at least about 1 mm. Electrode 12 is attached to the negative electrode plate 11 by spot welded fixtures to form a bipolar electrode unit 12a.

An integral set of coaxial insulation rings 13 and 14, with a thickness of 3 to 5 mm., is cemented, or cast with epoxy, to each of the bipolar electrode units 12a. The electrode units are arranged within the centrifugal rotor cylinder 10 so that the negative end plate is formed by a nickel coated steel plate 15. A bus bar 16 connects plate 15, through the hollow shaft 4, to a slip ring 17. Contact brushes 18 are in clamped contact with the slip ring 17 and further connect to the negative terminal 18a of the battery. A positive bus bar 19 is attached to an end plate 20 of the uppermost cell and connects through the shaft 4 to a slip ring 21. Contact brushes 22 are in clamped contact with ring 21 and connect to a positive terminal 22a of the battery. Each adjacent pair of the series connected cells of the bipolar electrodes is sealed by O-rings 23 and 24 to prevent shortcircuiting and electrolyte leaks.

The space underneath the separation floor 6 is divided into an annular electrolyte containing volume 25 and a cylindrical, centrally-located control device volume 26, the later containing a valve operating assembly. The electrolyte space 25 is divided by annular walls 27 into annular compartments for sedimenting the zinc oxide and other particles before the electrolyte is recirculated by a pump 27a to the cells. A compartment 28 is preferably filled with an appropriate filtering material, for instance with a dense mesh of stainless steel.

Figure 3:
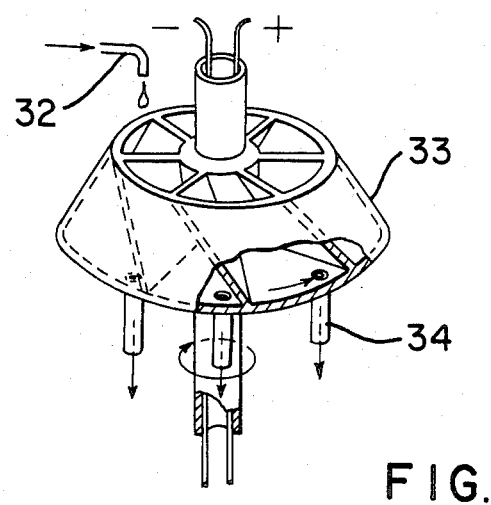
FIG. 3 is a more detailed schematic view of the electrolyte feed rotor, visible in the upper part of FIG. 1.

The pump 27a pumps or lifts the electrolyte through a tube 29 to a filtering centrifuge 30 at the top of the centrifugal rotor 10 for final removal of any possible remaining insoluble particles. The space above a separation floor 31 houses a streamlined tube 32 bent against the direction of rotation and mounted at 32a to the top of container 1. Tube 32 transfers the electrolyte, by ram pressure, to an electrolyte dispensing device having a distribution rotor housing 33 that proportionally meters the electrolyte into each cell through tubes 34 that originate from the distribution rotor outer rim. In the illustrated embodiment there are two tubes 34 for each cell. The principle of construction of the distribution rotor is shown in more detail in FIG. 3. The illustrated construction avoids intercell short circuit paths through the electrolyte.

Figure 2:
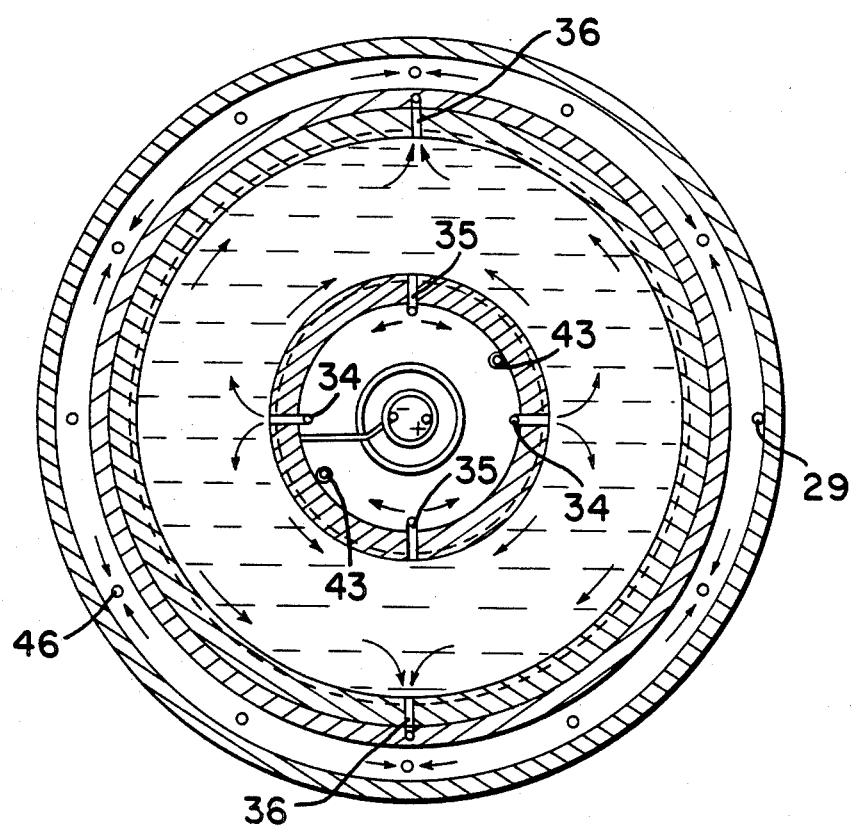
FIG. 2 is a horizontal cross-sectional view along lines 2—2 of FIG. 1.

Referring to FIG. 2, according to the illustrated embodiment, each cell, in addition to the two filling tubes 34, has two overflow and gas vent tubes 35, also at the inner ring of the cell, and two drain tubes 36 at the outer ring. The drain tubes of the cells direct the electrolyte, if any, to a valve plate 38 (FIG. 1), equipped with seals 37 and located at the bottom of the rotor. The valve plate can be closed through a control pin and spring assembly 39 to prevent draining of electrolyte through drain tubes 36.

Figure 4:
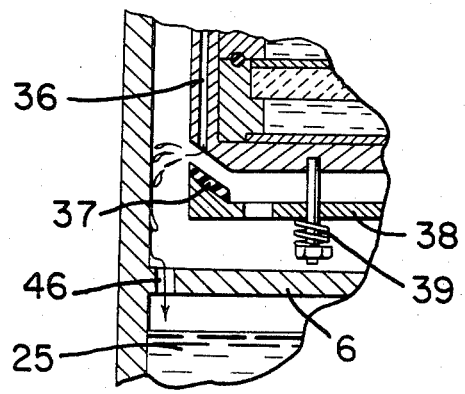
FIG. 4 is a view of the electrolyte drain valve assembly under the cell stack, in the open position.

Referring to FIGS. 1 and 4, the valve plate 38 attaches to a shaft 40 which is provided with about 10 mm of play in the vertical direction. When an electric actuator 41 receives a current pulse from an electronic control circuit 41a, it pulls down the flange at the end of the shaft 40 and, by bearing assembly 42, pulls down the valve plate 38 to open all drain tubes 36 simultaneously. By adjusting the control parameters of the control circuit of the actuator 41, the duration of cell drain pulses and their intervals can be programmed to a high accuracy. This method of pulsed electrolyte flow through the cells prevents the deposition of reaction products on the cell walls during cell discharge and homogenizes the zinc layer growth during cell charging.

A centrifugal force in the order of 100 g's at the cell stack outer ring has been found necessary for effective operation. The centrifugal force at the inner ring of the cell is then about 30 to 50 g's. Such an intense centrifugal force generates a rather abrupt electrolyte flow pulse when the drain valves are opened. The duration of opening pulses of the valve plate should only be about 0.1 second to avoid detrimental electrolyte deficiency in the cells. The interval between the pulses is preferably between 1 and 100 seconds, depending upon the magnitude of the charge or discharge currents in the battery. To achieve satisfactory operation, the quantity of zinc ions flowing through the cell during charge mode of operation is preferably about ten times the quantity of deposited zinc ions in the reaction. The repetitive and abrupt flow pulses of electrolyte prevent shape changes in the zinc layer deposited during the charge mode.

The possible excess of electrolyte drains from the cells through the overflow tubes 35, flows along the wall of the center tube to and through holes 43 in the bottom of container 10, and through holes 44 and 45 on the separating floor 38. From there, the electrolyte flows through holes 46, to the electrolyte containing volume, supply reservoir 25. This electrolyte containing volume 25 is preferably a replaceable tank, separable from the battery structure. When the pump 27a and the motor 2 are stopped, the electrolyte contained in the filter centrifuge 30 flows through holes 47 at the top of the container to the electrolyte containing volume 25. The cells, when rotation stops, are left full of the electrolyte, retaining full operating readiness.

In addition to the electrolyte container or reservoir 25 (an equivalent separate tank can also be employed), the battery is preferably provided with two smaller auxiliary tanks. One of these tanks, tank 47a, contains distilled water, possibly mixed with a corrosion inhibitor additive for zinc protection (e.g., $H_3BO_3$), and the other tank, tank 47b, the KOH electrolyte, void of zinc ions. These auxiliary tanks are advantageous for the following reasons:

(1) When it is desired to maintain a fully charged battery in operating readiness for a lengthy time duration, with practically no self-discharge, the following procedure can be executed:
 (a) Pump 27a is shut off;
 (b) The cells are emptied of electrolyte by opening the drain valves;
 (c) Rotation motor 2 is shut off and all electrolyte is allowed to drain into container 25;
 (d) Rotation motor 2 is restarted;
 (e) The drain valves are closed;
 (f) Distribution rotor 33 is filled with distilled water through a separate tube (not shown) until the cells are completely filled; and
 (g) The rotation motor 2 is shut off again. The battery is now in a passive state, and it can be activated in a short time by starting the rotation motor 2 and the electrolyte pump 27a. This causes all water from the cells to flow into the water tank through a valve (not shown). The water tank is provided with an ion exchange filter, and the valve controlling the flow to the tank is set to a closed position corresponding to the normal electrolyte circulation after a selected time duration.

(2) The zinc electrode is charged with a higher efficiency than the nickel electrode. Consequently, the zinc layer tends to grow steadily thicker during charge-discharge cycling. To offset this effect, after a preset number of operating hours, the pump 27a is switched to pump electrolyte from a tank filled with KOH electrolyte void of zinc during charge, while the returning electrolyte is directed to flow through a zinc-absorbing filter back to the tank. This arrangement charges only the nickel electrode, while the zinc electrode generates hydrogen gas during charge. The hydrogen gas is vented from the battery through the hollow rotating shaft 4 and joint 3. During the next discharge cycle, the excess zinc layer will be consumed, and the battery again operates without disturbance.

The illustrated embodiment of the invention further provides compensating for the different charge efficiencies of the nickel and zinc electrodes by such a charging method which, in each charge, cycle automatically balances the deposited zinc layer in accordance with the state of charge of the nickel electrodes. In accordance with this method, the system employs an automatic charge control that stops operation of the electrolyte pump 27a and the control circuits of the drain valves (to close the valves) when about 20% of the full-charge capacity of the nickel electrodes remains. In this condition, the zinc contained in the relatively small amount of electrolyte in the cells is deposited in a short time. During the final phase of the charge, only the nickel electrode is charged. This method thus eliminates any need for the auxiliary tank containing zinc ion-free (KOH) electrolyte, as described above.

The power supply for the motor 2 and the pump 27a is preferably provided, for instance, by a small Ni-Cd battery which is connected in parallel via a charging circuit with the battery constructed in accordance with the preferred illustrated embodiment of the invention.

The control circuit 41a can employ a programmable logic unit (such as the MELSEC F-20) to control the pump 27a, the motor 2, the solenoid valve actuator 41 and the valves, preferably magnetic valves 88, 90, that are needed for changing the electrolyte circulation for the different electrolytes stored in the auxiliary tanks 47a, 47b.

The embodiment described above is an application of the invention to a Ni-Zn battery. It is apparent that within the scope of the following claims, the invention can be applied to all electrochemical systems having a liquid electrolyte, and most advantageously in such systems in which the negative electrode is formed by a metal, soluble in the electrolyte. Accordingly, additions, subtractions, deletions and other modifications of the invention will be apparent to those skilled in the art and are within the scope of the following claims.

What is claimed is:

1. A rechargeable electrochemical generator comprising
 a rotatable container,
 means for mounting in said container a plurality of electrode cell assemblies,
 means for circulating an electrolyte solution through said cell assemblies,
 means for rotating said container for subjecting said electrolyte solution to a centrifugal force,
 each said electrode cell having an anode and a cathode electrode element, each said anode and each said cathode having a substantially planar surface in contact with said electrolyte solution, and
 said mounting means positions said electrode cell assemblies so that the planar surfaces of said electrodes at least partially align with the radial direction of said centrifugal force.

2. The rechargeable electrochemical generator of claim 1 wherein
 said mounting means positions said electrode cell assemblies so that the planar surfaces are aligned parallel to said direction of centrifugal force.

3. The rechargeable electrochemical generator of claim 1 further wherein
 said anode and cathode electrode elements each comprise a planar annulus, and further comprising
 stackable annular inner and outer isolation rings, coaxial with said electrode elements, for securing and spacing said electrode elements in stable stacked positional relationship.

4. The rechargeable electrochemical generator of claim 3 further comprising
 means for connecting adjacent anode and cathode electrode elements, and
 sealing ring means for each of the inner and outer isolation rings for inhibiting the flow of electrolyte solution around said isolation rings.

5. The rechargeable electrochemical generator of claim 1 further comprising
 a storage reservoir for said electrolyte solution,
 means for effecting a circulating fluid flow path from said reservoir to said cells and back to said reservoir,
 means for filtering said circulating electrolyte fluid flow, and
 means for selectively driving said fluid in said circulating path.

6. The rechargeable electrochemical generator of claim 5 further comprising
 at least one inlet port for each cell, each inlet port being connected for receiving electrolyte fluid from said drive means,
 at least one outlet port for each cell,
 means connecting each outlet port to said reservoir of electrolyte solution,
 controllable valve means in said circulating path for allowing the circulating movement of fluid in an open state and for preventing the circulating movement of electrolyte fluid in a closed state, and
 means for operating said controllable valve in a pulsed mode.

7. The rechargeable electrochemical generator of claim 6, further comprising
 means for mounting said valve means in the circulating flow path between said outlet ports and said reservoir,
 whereby said electrolyte remains in said cells when the drive means is stopped after the valve means is in the closed state.

8. The rechargeable electrochemical generator of claim 5 further comprising
 an overflow port at the inner isolation ring of each said electrode cell assembly, and
 means for connecting each said overflow port in fluid communication with said reservoir.

9. The rechargeable electrochemical generator of claim 1 further comprising
 means for rotating said cells about a rotation axis for generating a centrifugal force of about 100 g's at the outer isolation ring of each cell assembly.

10. The rechargeable electrochemical generator of claim 1 further comprising
 an electrolyte dispensing device connected to said rotatable container, and
 means for fluidly connecting each electrode cell to a radially outward portion of said dispensing device,
 whereby fluid is directed from said device, by centrifugal force, to each said electrode cell.

11. The rechargeable electrochemical generator of claim 1 further comprising
 a stationary compartment integrally connected to said rotatable compartment and having at a bottom portion thereof an annular fluid reservoir, and
 means for dividing said reservoir into a plurality of annular, fluid communicating, compartments for removing sediment from the recirculating electrolyte,
 at least one of said annular compartments receiving said recirculating fluid from said rotating container.

12. The rechargeable electrochemical generator of claim 1 further comprising
 a motor,
 means for connecting said motor in a driving relationship to said container, and
 means for electrically charging and electrically discharging said electrode cells.

13. The rechargeable electrochemical generator of claim 1 further comprising
 a first and a second auxiliary storage tank,
 a controllable valve means for connecting said tanks to said circulating means, and
 an electrical control circuit means for operating said valves, said circulating means, and said rotating means for placing said generator in a passive state.

14. The rechargeable electrochemical generator of claim 1 further comprising
 an auxiliary tank,
 a controllable valve means connecting said tank to said circulating means, and
 an electrical control circuit means for operating said circulating means and said valves for selectively circulating an ion deficient electrolyte through said apparatus, thereby correcting differential layer build-up on said electrode elements.

15. The rechargeable electrochemical generator of claim 1 further comprising
 an electrical control circuit means for operating said circulating means, said control circuit stopping circulation of said electrolyte during a selected end period of a charge cycle.

16. A rechargeable electrochemical nickel-zinc battery comprising
 a rotatable container,
 means for mounting in said container a plurality of electrode cell assemblies,
 means for circulating an electrolyte solution through said cell assemblies,
 means for rotating said container for subjecting said electrolyte solution to a centrifugal force,
 each said electrode cell having an anode and a cathode electrode element, each said anode and each said cathode having a flat annulus shape and a substantially planar surface in contact with said electrolyte solution,
 stackable annular inner and outer isolation rings coaxial with said electrode elements for securing and spacing said electrode elements in a stable stacked positional relationship,
 said mounting means including means for positioning said electrode cell assemblies so that the planar surface of each electrode aligns with the radial direction of said centrifugal force,
 means for spot welding adjacent anode and cathode electrode elements for forming a series cell connection,
 a storage reservoir for said electrolyte solution,
 means for directing a circulating fluid flow path from said reservoir to said cells and back to said reservoir,
 means for filtering said circulating electrolyte fluid flow,
 means for selectively driving said fluid along said circulating path, each cell having at least one inlet port, each inlet port being connected for receiving electrolytic fluid from said drive means, each cell having at least one outlet port, means for selectively connecting each outlet port to said reservoir of electrolyte solution, controllable valve means in said circulating path between said outlet port and said reservoir for allowing the circulating movement of fluid in an open state and for preventing the circulating movement of electrolyte fluid in a closed state, means for operating said controllable valve in a pulsed mode, an overflow port at the inner isolation ring of each said electrode cell assembly, means for connecting each said overflow port in fluid communication with said reservoir, and means for rotating said cells about a rotation axis for generating a centrifugal force of about 100 g's at the outer isolation ring of each cell assembly.

* * * * *